United States Patent [19]

Schlosser et al.

[11] Patent Number: 5,968,122
[45] Date of Patent: Oct. 19, 1999

[54] METHOD FOR PROPAGATING BETWEEN VIEWS OF CONNECTION OBJECT STATUS IN NETWORK

[75] Inventors: John K. Schlosser, Falls Church; Joel Rariden, Ashburn; Bhalchandra R. Ketkar, McLean, all of Va.; Gregory A. Bathrick, Phoenix, Ariz.

[73] Assignee: Alcatel Alsthom Compagnie Generale d'Electricite, Paris, France

[21] Appl. No.: 08/834,817

[22] Filed: Mar. 31, 1997

[51] Int. Cl.[6] ................................................. G06F 15/177
[52] U.S. Cl. ........................... 709/223; 709/220; 714/25; 714/31
[58] Field of Search ............. 395/185.05, 200.5–200.55, 395/183.01–183.07; 714/52, 25, 26, 27, 28, 29, 30, 31; 709/220, 221, 222, 223, 224, 225

[56] References Cited

U.S. PATENT DOCUMENTS

| | | | |
|---|---|---|---|
| 5,295,244 | 3/1994 | Dev et al. | 395/161 |
| 5,471,399 | 11/1995 | Tanaka et al. | 364/491 |
| 5,504,921 | 4/1996 | Dev et al. | 395/200.53 |
| 5,513,171 | 4/1996 | Ludwiczak et al. | 370/254 |
| 5,513,343 | 4/1996 | Sakano et al. | 395/183.02 |
| 5,535,335 | 7/1996 | Cox et al. | 395/200.11 |
| 5,655,081 | 8/1997 | Bonnell et al. | 395/200.32 |
| 5,761,502 | 6/1998 | Jacobs | 707/103 |
| 5,774,655 | 6/1998 | Bloem et al. | 395/200.5 |
| 5,793,362 | 8/1998 | Matthews et al. | 395/200.53 |

OTHER PUBLICATIONS

"Introduction to Using HP OpenView Network Node Manager," pp. 1–1 through 1–22, date unknown.

*Primary Examiner*—Meng-Ai T. An
*Assistant Examiner*—Harold Kim
*Attorney, Agent, or Firm*—Ware, Fressola, Van Der Sluys & Adolphson LLP

[57] ABSTRACT

A scheme for propagating, between views of a network, status information for elements of the network in a way that mirrors how the network is maintained. The propagation scheme divides the elements of the network into either connections or equipment, groups the elements in each of these two partitions into increasingly higher-level views and propagates status of fundamental and compound objects between the different views to help locate the source of any malfunction of the network. This status propagation scheme is particularly suited for monitoring a wide-area network, where there are more connections and more complex equipment than in a typical local area network, these connections are usually more geographically disbursed, and most importantly these connections are maintained by different people than those who maintain the other equipment of the network. By providing both a multi-level equipment hierarchy and a multi-level connection hierarchy, and providing both upward and sometimes downward propagation of status information between different views of the network, the present invention makes possible more rapid diagnostic of both connection and other equipment malfunction.

11 Claims, 4 Drawing Sheets

METHOD FOR PROPAGATING BETWEEN VIEWS OF CONNECTION OBJECT STATUS IN NETWORK

BACKGROUND OF THE INVENTION

1. Technical Field

The present invention pertains to the field of network fault management tools. More particularly, the present invention concerns reporting to a user the status of components of a wide area network.

2. Prior Art

A propagation scheme is a method used by a network to indicate to a user information about the status of elements of the network, enabling the user to locate the source of a network malfunction. A propagation scheme developed by Hewlett Packard is accomplished by the Hewlett Packard Open View (HPOV) process called the Network Node Manager, version 3.31, which runs in the HPOV environment. The propagation scheme carried out by this HPOV process, called here the standard HPOV propagation scheme, is intended for use in a transmission control program/internet protocol (TCP/IP) network. Any HPOV propagation scheme, i.e. any propagation scheme running under HPOV, assumes that elements of the network exchange status information according to a simple network management protocol (SNMP).

HPOV is a configuration, performance, and fault management application for multivendor TCP/IP networks; it performs many functions. For example, it automatically discovers what devices are on the network and monitors their status. It automatically draws network maps and submaps based on the discovered devices, and places the discovered devices in one or another submap, based on topology. A network submap represents the physical topology of the network at the level of network segments (subnetworks) and gateways (routers), repeaters, multiport repeaters (hubs), and bridges that are attached to those segments.

The standard HPOV propagation scheme works well for Local Area Networks (LANs), but does not work very well for wide area networks. Its upward propagation scheme can incorrectly report interface level status at the equipment level (i.e. a problem at the physical line level is reflected in the status of the node). In addition, the standard HPOV propagation scheme does not downward propagate. Without downward propagation, an operator cannot determine that a sub-component is out-of-service purely because a component at an upper level has malfunctioned.

What is needed is a propagation scheme more suitable for a wide area network, i.e., a kind of network that generally has more complex equipment and connection hierarchies and is more geographically dispersed than a LAN, and in which connections are maintained separately from the other equipment. In particular, what is needed is an HPOV propagation scheme that does not report status problems at higher levels than is accurate.

SUMMARY OF THE INVENTION

An object status propagation scheme according to the present invention uses two separate parallel full hierarchies of submaps of objects of a network, an equipment hierarchy and a connection hierarchy, to trace the origin of a malfunction in the network. An object is an aggregation of elements of the network, the elements being either connections or other equipment. A submap is a view of the network at a particular level of detail, so that the objects shown in the view are a particular aggregation of some of the network elements. The object status propagation scheme indicates the status of each object in each level of each hierarchy. The status of a given object results from the scheme propagating status information from lower level objects, aggregated as the given object, and from any upper level objects that support the given object.

In the present invention, the connection hierarchy has multiple levels. The submaps of the connection hierarchy may trace from objects in submaps at different levels in the equipment hierarchy, but each trace results in a multi-level family of submaps from the connection hierarchy. This feature emphasizes the importance of connections, as is appropriate in some network environments such as a wide area network.

In each of the two parallel hierarchies of submaps of objects, the scheme of the present invention propagates, either upward or downward, the status of a first object determined on the basis of an event in the object itself or by an event in another object associated with the first object at another level in the hierarchy. (Upward propagation allows for the status of an object to indicate at a higher level submap, and downward propagation allows the status of an object to indicate at a lower level submap.) The scheme propagates status differently in the two submap hierarchies; it provides downward propagation only for the equipment hierarchy, not the connection hierarchy, and it propagates only operational status conditions, not administrative status conditions.

In downward propagation, when a supporting object fails, the scheme changes the status of supported objects that have a normal status to warning, and identifies the status as inherited. When the supporting object is restored to service, the scheme returns the supported objects to their pre-inherited status.

Breaking the components of a wide area network into two parallel hierarchies is motivated by the operational reality that the connection hierarchy is identified with services to users of the wide area network. The people tasked with maintaining services are different from those who maintain the other equipment. The present scheme provides a clear view of each hierarchy of submaps, allowing the people responsible for maintaining each kind of object to more efficiently locate and analyze problems they are responsible for solving.

BRIEF DESCRIPTION OF THE DRAWINGS

The above and other objects, features and advantages of the invention will become apparent from a consideration of the subsequent detailed description presented in connection with the accompanying drawings, in which.

DESCRIPTION OF THE PREFERRED EMBODIMENT

In the preferred embodiment, a network is viewed as comprising various equipment type levels and various connection type levels. Lower levels correspond to more detailed views of the network. Some of these more detailed views, also called submaps, are more finely resolved views of connections. Others are closer views of other kinds of equipment. Table 1 presents all of the views of each hierarchy according to the preferred embodiment. While these two hierarchies of views are particularly appropriate to a wide area network, the object status propagation scheme of the present invention is not restricted to a wide area network, or to the particular grouping within each hierarchy shown in Table 1.

TABLE 1

The different levels or views of each of the two hierarchies

| Hierarchy | Level | Description |
| --- | --- | --- |
| Connection | Network | the highest level view; the view of the entire network |
| | Inter-region | the submap or view showing the interconnection of nodes at a regional boundary |
| | Line | the submap showing the interconnection of lines between two particular nodes |
| | Channel | the submap showing the interconnection of channels between two particular lines |
| Equipment | Network | same description as for the connection hierarchy network level |
| | Sub-network | the submap showing the content of a particular region in nodes, and their interconnection |
| | Node | the submap showing the chassis content of a particular node |
| | Chassis | the submap showing the content in cards and other equipment of a particular chassis |
| | Line | the submap showing the content in lines of a particular card |

Figure 1:
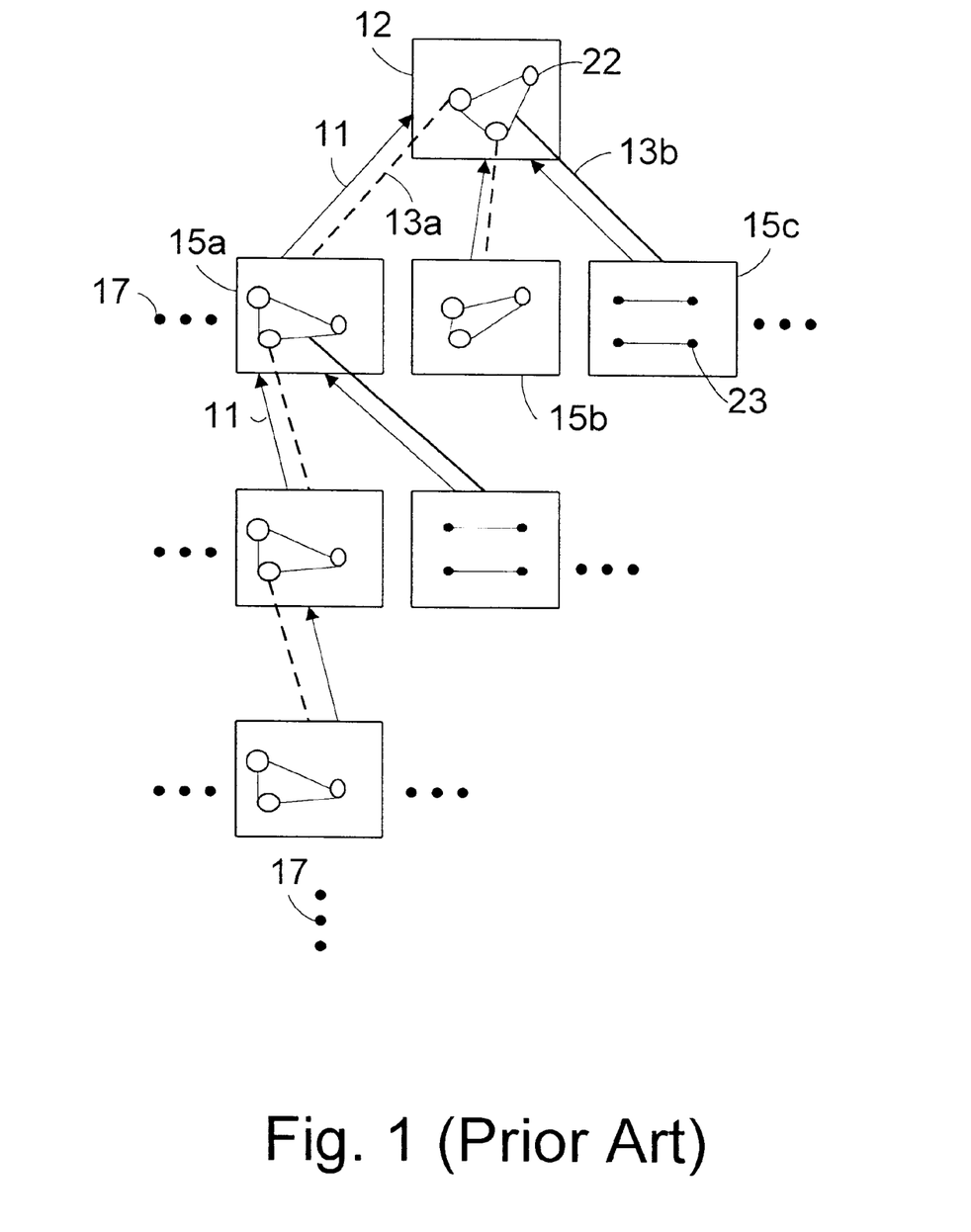
FIG. 1 is an illustration, according to the prior art, of propagation of status information between various submaps in a hierarchy convolved of both equipment and connection submaps.

Referring now to FIG. 1, a propagation scheme according to the prior art is illustrated. A highest level view of a network is shown as a submap 12. Most objects 22 at that level of the network are made up of lower-level objects 23. Three of the objects of the submap 12 are shown exploded into their component objects along paths in the hierarchy of submaps leading to the next highest level view of the network, comprising submaps 15a, 15b and 15c as well as other submaps, indicated by the ellipses 17, that would result on exploding other objects in the highest level view.

If an object in submap 12 is a connection type object, then it explodes to a lower level submap along a path in the hierarchy of submaps indicated by a solid line 13b. If an object in the higher level submap is not a connection type object but an object of some other kind of equipment, then it is shown exploded into its component objects along a path in the hierarchy of submaps using a dashed line 13a. In the prior art, a connection object is exploded at most one time; the prior art does not teach a multi-level hierarchy of submaps of connection objects.

If an object at a level in the hierarchy of submaps experiences an event that leads to an abnormal status, that abnormal status will be upward propagated as indicated by an upward propagation arrow 11. Only upward propagation is shown in FIG. 1, because, status propagation schemes of the prior art provide for only upward propagation. Moreover, status propagation schemes of the prior art convolve both connection type equipment and other equipment.

Figure 2A:
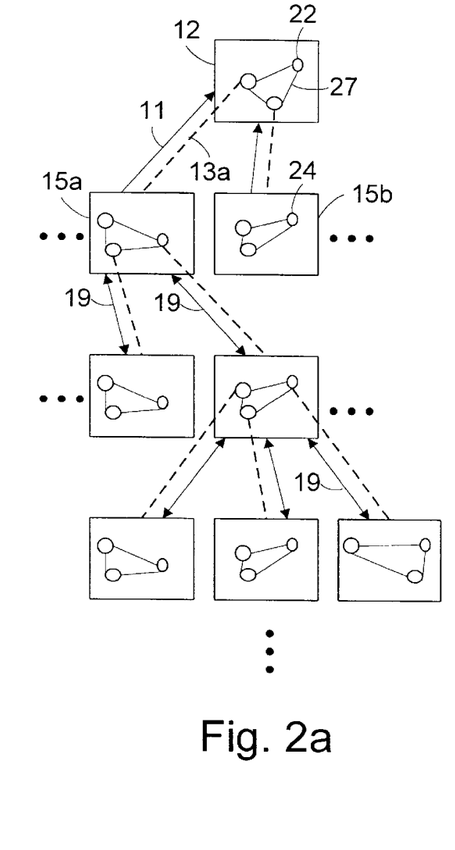
FIG. 2a is an illustration, according to the present invention, of propagation of status information between various submaps in an equipment submap hierarchy.
Figure 2B:
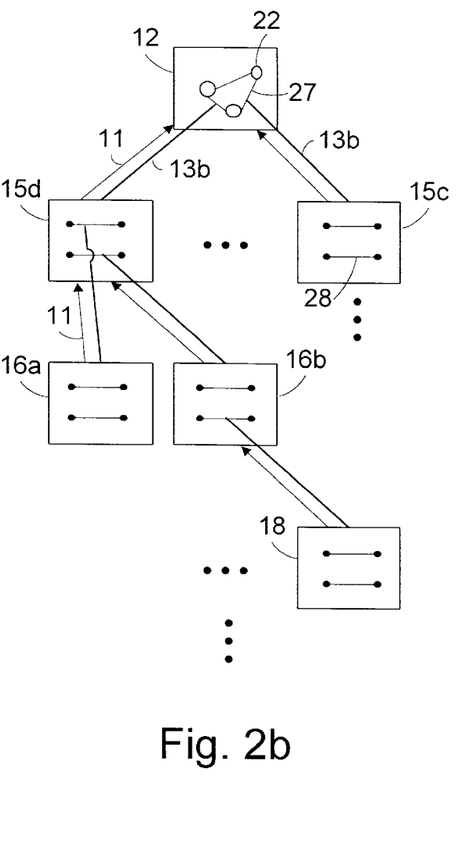
FIG. 2b is an illustration, according to the present invention, of propagation of status information between various submaps in an connection submap hierarchy.

The propagation scheme according to the present invention is illustrated in FIG. 2a and FIG. 2b. Referring now to FIG. 2a, the propagation of status information between submaps in the equipment hierarchy of submaps is illustrated. The highest level submap 12 contains both equipment objects 22 and connection objects 27. The next level of submaps includes submap 15a tracing from an equipment object in the top level submap 12. That submap 15a includes both equipment objects and connection objects that are aggregated in the highest level submap as an equipment object.

FIG. 2b illustrates propagation among submaps of the connection hierarchy tracing from connections in the top-level submap 12, the same submap 12 that begins the family of submaps in the equipment hierarchy, shown in FIG. 2a. The connection hierarchy also includes families of submaps tracing from connections in lower-level submaps of the equipment hierarchy, such as from connection objects in submap 15a or submap 15b of FIG. 2a. In the preferred embodiment, submaps of the connection hierarchy trace from only submaps in the top two levels of the equipment hierarchy.

When a connection object in a submap is exploded into a lower-level submap, that submap belongs to a multi-level connection hierarchy of the present invention. Thus, submap 15d of FIG. 2b, which is an exploded view of a connection object in submap 12, leads to further exploded views 16a–b, 18 of its connections. The levels of the connection and equipment hierarchies according to the preferred embodiment of the present invention are indicated in Table 1, and discussed below.

In the propagation scheme according to the present invention, status information of objects in the equipment hierarchy is propagated both upward and downward, as indicated by the propagation arrow 19 of FIG. 2a. In contrast, only upward propagation is performed in the hierarchy of submaps of connection-type objects, as indicated in FIG. 2b by the propagation arrows 11. FIG. 2b illustrates a particular path in the hierarchy of submaps of purely connection type objects, with higher-level connections 27 resolved at lower levels into discrete components 28.

Figure 3:
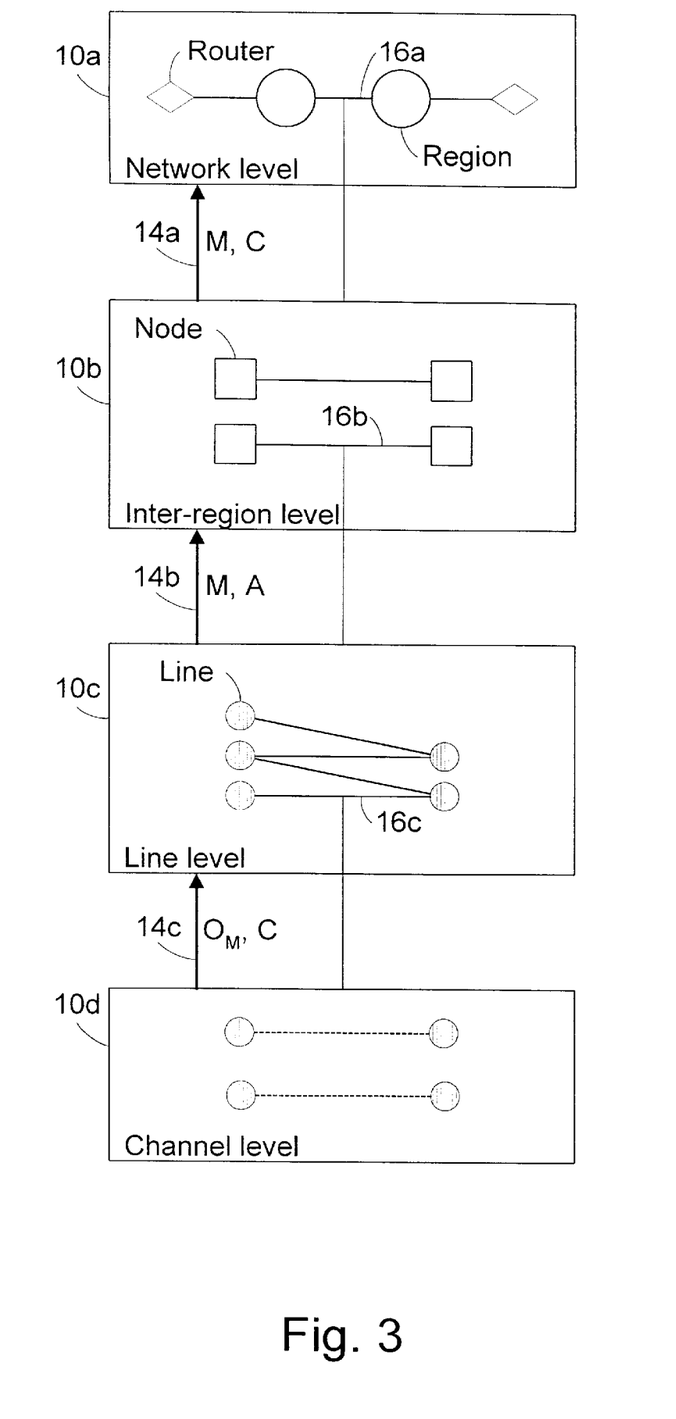
FIG. 3 is an illustration of propagation of status information between various submaps in the connection submap hierarchy.

Referring now to FIG. 3, a particular hierarchy of connection submaps 10a–d is shown. Each submap includes one or more symbols of one or more object types. The highest level submap 10a includes symbols for a router and a region, and shows connections, such as the connections 16a between two regions. That connection 16a is exploded in the lower level submap 10b into a plurality of connections, such as 16b between different nodes. This inter-region level submap 10b shows the individual nodes that comprise the regions shown in the higher level 10a. An upward propagation pointer 14a from the inter-region level 10b to the network level 10a indicates that the propagation scheme provides for upward propagation between these two levels. This upward propagation arrow 14a is marked with a code "M,C". The "M" indicates that the upward propagation here is the responsibility of a map manager, a unit of software that implements this aspect of the propagation scheme according to the present invention. The "C" indicates that only the status of connections is upward propagated from the inter-region level to the network level in this connection hierarchy of submaps. There is similar upward propagation from the line level to the inter-region level, as indicated by upward propagation arrow 14b, and from the channel level to the line level, as indicated by upward propagation arrow 14c. Table 2 provides a legend for the codes characterizing the upward and downward propagation.

TABLE 2

Codes used in indicating various aspects of object status propagation

| Code | Description |
| --- | --- |
| M | status is propagated by a map manager software unit |
| O_M | status is propagated by an agent of the standard HPOV propagation scheme |
| A | indicates that the status of all symbols is propagated |
| C | indicates that only the status of connection type objects is propagated |
| P | indicates that only the status of local line symbols is propagated |

FIG. 3 also shows upward propagation from the line level submap 10c to the inter-region level submap 10b, the upward propagation carried out by the map manager indicated by the code "M" beside the upward propagation pointer 14b. The status of all object types at the line level is propagated upward, as indicated by the code "A" beside the upward propagation pointer 14b. The connection 16b between two particular nodes in the inter-region level submap is shown more finely resolved in the line level submap 10c as a plurality of connections between different lines. One such line 16c is shown to comprise two channels, illustrated in the channel level submap 10d. The upward propagation pointer 14c from the channel level 10d to the line level 10c is labeled with the encoding "M,C" to indicate that upward propagation between the submap 10d and the submap 10c is provided by the HPOV process (Network Node Manager), and that only the status of connection-type objects is upward propagated between these levels in the connection hierarchy of submaps.

Figure 4:
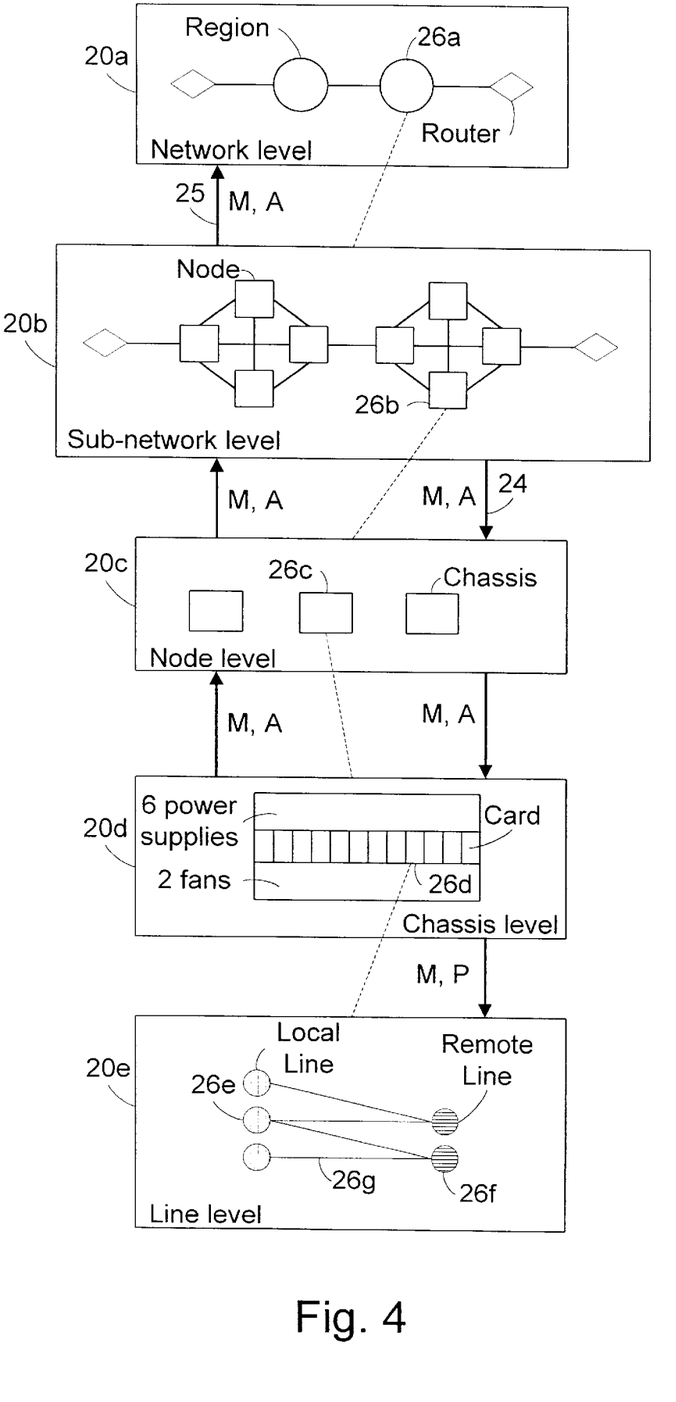
FIG. 4 illustrates propagation of status information between various submaps in the equipment submap hierarchy.

Referring now to FIG. 4, a particular equipment type hierarchy of submaps is shown, indicating where both upward and downward propagation of status information is carried out. The network level submap 20a includes router symbols and regions symbols. One region symbol 26a explodes into various nodes in a subnetwork level submap 20b. The upward propagation pointer 25 is labeled "M,A" to indicate that the upward propagation here is carried out by the map manager, and that the status of all objects in the subnetwork level submap is upward propagated. There is no downward propagation from the network level 20a to the subnetwork level 20b, because an object that appears at the subnetwork level does not in fact depend on any equipment at the higher, region level.

A particular node 26b is shown exploded into several chassis 26c at the node level 20c. There is shown in FIG. 4 full upward and downward propagation carried out by the map manager between the node level 20c and the subnetwork level 20b. Downward propagation arrows 24 indicate when downward propagation is carried out, and also indicate, using the code from table 2, the agent performing the propagation and what information is propagated. The downward propagation here is useful in indicating whether an abnormal status of chassis 26c is the result of an event in the subnetwork level 20b, specifically the node 26b, or an event within an element of the chassis itself. In the latter case, upward propagation from lower levels will pinpoint the source of the abnormality.

The chassis 26c is exploded into various power supplies, cards and fans as shown in the chassis level submap 20d. Six power supplies, twelve cards and two fans are shown comprising the chassis 26c. There is full upward and downward propagation provided by the map manager between the node level 20c and the chassis level 20d.

One card 26d in the chassis level 20d is shown more finely resolved at the line level 20e as three lines 26e designated as local lines because they are lines that are actually part of the card 26d, and two remote lines 26f, which are not part of the card 26d. The remote lines 26f are included in the submap 20e because they are connected to the local lines as shown by the connection indicators 26g. (These connection indicators 26g represent how the various physical lines 26e–f are interconnected; the connection indicators 26g do not represent physical lines.) There is no upward propagation from the line level 20e to the chassis level 20d. There is, however, downward propagation, provided by the map manager, of the status of local line symbols.

The Propagation Scheme in General

In the preferred embodiment of the propagation scheme according to the present invention, selected paths are available for propagation upward and downward in the submap hierarchy. These different paths are used to communicate status to a level being examined from other hierarchy levels without masking status information from the level being examined. Upward propagation of status information does not override downward propagation of status information. Downward propagation has priority because higher level objects have a larger impact on network operation. Downward propagation can only have the effect of changing the status of an object from normal to abnormal, not from abnormal for one reason to abnormal for another reason.

Local events have the greatest priority. An event that directly affects a first object and changes its status, as opposed to an event that changes the status of an object that supports the first object, will do so without regard to any downward propagated status. To understand this, it is necessary to consider downward propagation in somewhat more detail. In the propagation scheme according to the present invention, the failure of a supporting object changes, through downward propagation, the status of any supported objects from normal to warning. A warning status resulting from downward propagation is thus inherited from a supporting object. When the supporting object is restored to service, the status of the supported object is returned to its pre-inherited value.

Propagation of status to an object at a particular level is performed depending on a setting of each source of the status being propagated. The setting can be either compound or inherent. The default status source settings for each object type are shown in Table 3.

A compound setting allows the status of an object in a lower-level submap to be directly reflected in the next higher-level submap. In the preferred embodiment, status conditions are classified as one of two types: operational or administrative. In reflecting the status of a lower-level object in the status of a higher-level compound object (called the parent object), only operational status conditions-unknown, normal, warning, minor/marginal, major and critical-are propagated, not the administrative status conditions (unmanaged, testing, restricted and disabled).

TABLE 3

Default status source settings

| Hierarchy | Object | Status Source Setting |
|---|---|---|
| Equipment and Connection | Network | Compound |
| Equipment and Connection | Location (Region) | Compound |
| Equipment and Connection | Node | Inherent |
| Equipment | Chassis | Inherent |
| Equipment | Card | Inherent |
| Equipment and Connection | Line | Inherent |
| Equipment | Device | Inherent |
| Connection | Connector | Inherent |

When an object is set to compound status source, the propagation is handled by the HPOV process. When an object is set to inherent status source, the map manager propagates status from the lower level submaps to the parent object. The default propagation status sub-scheme performed by the HPOV process is shown in Table 4. Other sub-schemes are also used, but the present invention is not restricted to any particular sub-scheme for propagating status to a parent object.

TABLE 4

Default propagation status sub-scheme for upward propagation to a parent object

| Status of Child Object | Status Propagated to Parent |
|---|---|
| All normal | Normal |
| No abnormal and one or more unknown | Unknown |
| One abnormal and all others normal | Warning |
| Multiple abnormal and multiple normal | Minor |
| One normal and all others abnormal | Major |
| All abnormal | Critical |

Upward Propagation

For most objects, upward propagation according to the present invention uses the most critical source object status as the status for the destination object. There are a few exceptions, and Table 5, which summarizes upward propagation according to the present invention, indicates those exceptions.

Table 5 indicates that the upward propagation from chassis to node (the third row of Table 5) is the modified HPOV default propagation status sub-scheme. The source status of a chassis is programatically set based on the status of the chassis itself and on the status of its cards and other subordinate objects. The most severe of the compound and the actual chassis object status is used as the aggregate status.

TABLE 5

Summary of upward propagation for both the connection and equipment heirarchies

| Source Submap Level | Destination Submap Level | Object Types Propagated | Agent | Propagate Status Sub-scheme |
|---|---|---|---|---|
| Connection | Line | Connections only | $O_M$ | Most Critical |
| Line | Chassis | None | N/A | N/A |
| Chassis | Node | All | M | Modified HPOV Default |
| Node | Subnet | All | M | Most Critical |
| Subnet | Network | All | M | Most Critical |
| Line | Subnet | All | M | Most Critical |
| node | Inter-region | All | M | Most Critical |
| Inter-region | Network | Connections only | M | Most Critical |
| Line | Inter-region | All | M | Most Critical |

In the upward propagation from node to subnet, as indicated in row 4 of Table 5, the source status of a node is programatically set based on the status of the node itself and on that of its chassis and other subordinate objects. The most critical compound status scheme is used and the most severe of the compound and the actual node object status is the aggregate status reported to the user.

In the propagation scheme according to the present invention, a status of unknown is regarded as more severe than a status of normal. Submaps of all levels support upward propagation of some form, except that the submap of card does not propagate upward to the card object.

Table 5 also indicates which objects on a submap may contribute to the upward propagated status, and further, which propagation sub-scheme is used, either "HPOV default" or "most critical." So for example, a connection level submap will propagate to a line level submap only a status caused by the combined status of the various connections at the connection level. Also, there is no upward propagation from a line level submap to a chassis level submap, as indicated in Table 5. Finally, only the status of connections at the network submap level contribute to the upward propagated status at the inter-region level. With those exceptions, all other objects on a submap will contribute to the upward propagated status.

In the fourth column of Table 5, the agent responsible for carrying out the upward propagation is indicated. Upward propagation from the connection submap level to the line submap level is carried out by the HPOV process. Upward propagation to all other submap levels is carried out by the map manager.

Downward Propagation

The failure of a supporting object changes the supported objects with normal status to warning status. This downward status propagation is only performed for the equipment-type, not the connection-type, hierarchy of submaps. The downward-propagated warning status is understood as an inherited status. There are four instances of downward propagation changing the status of an object:

if a node is reported down, the map manager will change the status to warning of all chassis, cards, devices, and line symbols belonging to the node;

if a chassis is reported down, the map manager will change to warning, the status of all cards, devices, and lines belonging to the chassis;

if a card is reported down, the map manager will change the status of all lines belonging to the card;

if a node status is changed to unknown, the map manager will change to warning the status of all component chassis, cards, devices and lines.

Downward propagation from a chassis level submap to a line level submap is only applied to local lines, lines that occur in the submap because they are actually components of the chassis, not lines that are included in the submap but are not actually part of the chassis. An example of the use of downward propagation is where objects at a lower level form a higher-level object that depends on another object, such as a power supply to function. If the power supply fails, the higher-level object is no longer functional, and this information is downward propagated to the lower-level objects that in combination comprise the higher-level object depending on the power supply.

It is to be understood that the above-described arrangements are only illustrative of the applications of the principles of the present invention. Numerous modifications and alternative arrangements may be devised by those skilled in the art without departing from the spirit and scope of the present invention, and the appended claims are intended to cover such modifications and arrangements.

What is claimed is:

1. A method for finding in a network a source of an abnormal status of an aggregation of elements of the network, the network elements consisting of equipment and of connections between the equipment, the method comprising the steps of:

determining a top-level view of the network in which aggregations of equipment and connections are indicated as a plurality of objects, wherein each object is either a connection object or an equipment object;

determining a hierarchical plurality of upper-level views and lower-level views of aggregations of equipment and connections, wherein the aggregations comprise equipment objects and connection objects, the equipment objects of a lower-level view traceable from aggregations as equipment objects in a next higher-level view, the upper-level views and lower-level views of equipment objects constituting an equipment hierarchy;

determining a plurality of upper-level views and lower-level views of aggregations of connections, wherein the aggregations comprise connection objects, the connection objects of a lower-level view traceable from the aggregations of connection objects in a next higher-level view, or from an aggregation of connections in a connection object indicated in a higher-level view of equipment objects, the upper-level views and lower-level views of connection objects constituting a connection hierarchy;

examining the status of any object of the network; and propagating from a lower level to a next higher level the status of an object located on the lower level, and indicating the status of an object on a lower level to the next higher level, whereby the source of an object having an abnormal status can be located from a higher level.

2. A method as claimed in claim 1, further comprising the step of:

for the equipment hierarchy, indicating at a lower level that an object is out-of-service because of an abnormal status of an object at a higher level; and locating an equipment object at a higher-level that is the source of an abnormal status of an equipment object at a lower level.

3. A method as claimed in claim 2, wherein the step of examining the status of any object of the network includes a means by which the user may command a view of a level of either hierarchy adjacent the level with an object whose status the user is examining.

4. A method as claimed in claim 2, wherein a change in status of an object resulting from an upward-propagated abnormal status overrides a downward-propagated status.

5. A method in claim 1, wherein the step of examining the status of any object of the network includes commanding a view of a level of either hierarchy adjacent the level with an object whose status is being examined.

6. A method for use in a network consisting of elements that are either equipment or connections between the equipment, with different aggregations of the elements constituting network objects, each network object having a status, the status of a particular network object having various possible values including some values characterized as abnormal because of an event or a condition associated either with another network object or associated with the particular network object itself, a given network object said to have as a source of an abnormal status either the given network object itself or another network object on which the given network object depends directly or indirectly and that has an abnormal status not traceable to any other network object, the method to be used when a network object has an abnormal status, the method to be used for finding the source of the abnormal status of the network object, the method comprising the steps of:

providing a top-level view of the network, the top-level view showing network objects, each network object in the top-level view being either an equipment object representing an aggregation of equipment and connections, or a connection object representing an aggregation of connections;

providing a plurality of lower-level views of equipment objects and connection objects, the plurality of lower-level views in combination with the top-level view constituting a first hierarchy of views, each particular lower-level view for providing an exploded view of a particular network object in a particular higher-level view of the first hierarchy, the particular higher-level view said to be the next higher level view with respect to the particular object in the particular lower-level view;

providing a plurality of lower-level views of only connection objects, each lower-level view of only connection objects indicating what the connection objects in the lower-level view connect, the plurality of lower-level views of only connection objects in combination with the top-level view constituting a second hierarchy of views, each particular lower-level view of only connection objects for providing an exploded view of a particular network object in a particular higher-level view of either the first or second hierarchy, the particular higher-level view said to be the next higher level view with respect to the particular network object in the particular lower-level view;

providing means by which a user may examine the status of a network object in either the first or second hierarchy of views; and upward propagating the status of at least one network object in a lower-level view so as to be reflected in the status of a network object in a higher-level view including the at least one object;

whereby the source of the abnormal status of the network object may be found in a lower-level view.

7. A method as claimed in claim 6, further comprising the step of:

propagating downward to a lower-level view in the first hierarchy an abnormal status of an equipment object;

whereby an equipment object that is the source of an abnormal status of an equipment object in a lower-level view may be found.

8. A method as claimed in claim 7, wherein a change in status of an object resulting from an upward-propagated abnormal status overrides any downward-propagated status.

9. An apparatus for use in a network consisting of elements that are either equipment or connections between the equipment, with different aggregations of the elements constituting network objects, each network object having a status, the status of a particular network object having various possible values including some values characterized as abnormal because of an event or a condition associated either with another network object or associated with the particular network object itself, a given network object said to have as a source of an abnormal status either the given network object itself or another network object on which the given network object depends directly or indirectly and that has an abnormal status not traceable to any other network object, the apparatus to be used when a network object has an abnormal status, the apparatus to be used for finding the source of the abnormal status of the network object, the apparatus comprising:

means for providing a top-level view of the network showing network objects, each network object in the top-level view being either an equipment object representing an aggregation of equipment and connections, or a connection object representing an aggregation of connections;

means for providing a plurality of lower-level views of equipment objects and connection objects, the plurality of lower-level views in combination with the top-level view constituting a first hierarchy of views, each particular lower-level view for providing an exploded view of a particular network object in a particular higher-level view of the first hierarchy, the particular higher-level view said to be the next higher level view with respect to the particular object in the particular lower-level view;

means for providing a plurality of lower-level views of only connection objects, each lower-level view of only connection objects indicating what the connection objects in the lower-level view connect, the plurality of lower-level views of only connection objects in combination with the top-level view constituting a second hierarchy of views, each particular lower-level view of only connection objects for providing an exploded view of a particular network object in a particular higher-level view of either the first or second hierarchy, the particular higher-level view said to be the next higher level view with respect to the particular network object in the particular lower-level view;

means by which a user may examine the status of a network object in either the first or second hierarchy of views; and means for upward propagating the status of at least one network object in a lower-level view so as to be reflected in the status of a network object in a higher-level view including the at least one object;

whereby the source of the abnormal status of the network object may be found in a lower-level view.

10. An apparatus as claimed in claim 9, further comprising:

means for propagating downward to a lower-level view in the first hierarchy an abnormal status of an equipment object;

whereby an equipment object that is the source of an abnormal status of an equipment object in a lower-level view may be found.

11. An apparatus as claimed in claim 10, wherein a change in status of an object resulting from an upward-propagated abnormal status overrides any downward-propagated status.

* * * * *

UNITED STATES PATENT AND TRADEMARK OFFICE
CERTIFICATE OF CORRECTION

PATENT NO : 5,968,122
DATED : October 19, 1999
INVENTOR(S) : Schlosser et al.

It is certified that error appears in the above-identified patent and that said Letters Patent is hereby corrected as shown below:

Title page, item [56] References Cited
    U.S. PATENT DOCUMENTS
    --5,559,955  9/1996  Dev et al.............
    395/182.02-- should be added.

Signed and Sealed this

Fifth Day of December, 2000

Q. TODD DICKINSON

Attest:

Attesting Officer

Director of Patents and Trademarks